No. 708,121. Patented Sept. 2, 1902.
H. BROCKELT.
DEVICE FOR OVERCOMING ALTERNATING CURRENTS IN DIRECT CURRENT CIRCUITS.
(Application filed Mar. 28, 1902.)
(No Model.)
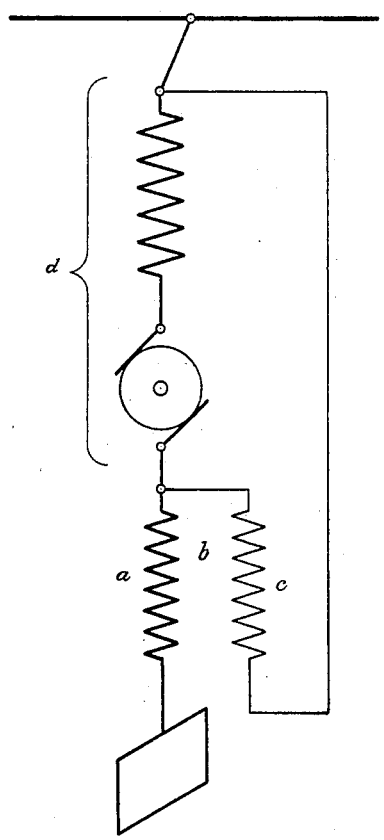
Witnesses.
Inventor.
Hermann Brockelt
by E. Witte
Attorney.

United States Patent Office.

HERMANN BROCKELT, OF BERLIN, GERMANY.

DEVICE FOR OVERCOMING ALTERNATING CURRENTS IN DIRECT-CURRENT CIRCUITS.

SPECIFICATION forming part of Letters Patent No. 708,121, dated September 2, 1902.

Application filed March 28, 1902. Serial No. 100,382. (No model.)

*To all whom it may concern:*

Be it known that I, HERMANN BROCKELT, a subject of the German Emperor, residing in Berlin, in the Kingdom of Prussia, Germany, have invented certain new and useful Improvements in Devices for Overcoming Alternating Currents in Direct-Current Circuits, of which the following is a specification.

My invention relates to means for destroying disturbing alternating currents in the conductors of electric railroads working with direct current.

As is well known, the counter force which is generated in electromotors driven by direct current is not absolutely constant, but is variable. This counter electromotive force can be imagined as consisting of the sum of a uniform electromotive and a relatively smaller electromotive force constantly alternating in direction. The alternating current arising through the latter is the cause of telephone disturbances with electric railroads working with a direct current.

My invention is illustrated by the annexed drawing, which is a diagram of the connections employed.

According to my invention a transformer is so arranged that the flow of the disturbing alternating currents into the external circuit is prevented by the primary winding $a$ of the transformer $b$, which winding is inserted in the working circuit, producing in its secondary winding $c$, which is connected in a shunt-circuit of the series motor $d$, a current opposed to the generating-current and tending to overcome the latter in consequence of temporal deviation, according to the well-known law of Lenz, on the common path of current through the motor $d$. If, therefore, effect and counter effect are equal, no alternating current can reach the external circuit. Such a condition of counterbalance is approximately attainable, as experiment shows.

The arrangement differs from an already well-known like arrangement of a transformer for removing the collateral noises in telephones in that the disturbing alternating current inside the circuit of the telephone-receivers is overcome, but not at the source itself.

The practical advantage of this arrangement over similar arrangements for the same purpose is that the self-induction with transformers of properly-chosen dimensions is not increased, so that vigorous sparking between the sliding loop and the conductor is prevented, and thus rapid wear of the parts successfully avoided. The arrangement also differs from another well-known method, according to which the secondary winding of a transformer is connected to the exclusion of the field-magnets of the motor in shunt to the primary coil.

Having thus described my invention, what I claim as new, and desire to secure by Letters Patent, is—

In means for destroying the disturbing alternating current in the conductors of electric railroads worked with direct current, a transformer the primary winding of which is connected in the series circuit, and the secondary in a shunt-circuit to the motor, in such manner that on the common path through the motor, the alternating current generated by the latter flows in opposite direction to the current produced in the secondary winding, for the purpose of removing the former, substantially as described.

In testimony whereof I have hereunto signed my name in the presence of two subscribing witnesses.

HERMANN BROCKELT.

Witnesses:
ENRIQUE VITTE,
HENRY HASPER.